(12) United States Patent
Lian et al.

(10) Patent No.: US 8,174,388 B2
(45) Date of Patent: May 8, 2012

(54) METHOD AND SYSTEM FOR DEACTIVATION OF COMBINATION EAS/RFID TAGS

(75) Inventors: Ming-Ren Lian, Boca Raton, FL (US); Richard Loyd Copeland, Lake Worth, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 420 days.

(21) Appl. No.: 12/469,775

(22) Filed: May 21, 2009

(65) Prior Publication Data

US 2010/0141452 A1 Jun. 10, 2010

Related U.S. Application Data

(63) Continuation-in-part of application No. 12/331,604, filed as application No. PCT/US2005/041679 on Nov. 18, 2005, now Pat. No. 8,013,742.

(60) Provisional application No. 60/630,351, filed on Mar. 4, 2009.

(51) Int. Cl.
*G08B 13/14* (2006.01)
*H04Q 5/22* (2006.01)

(52) U.S. Cl. ............... 340/572.3; 340/572.1; 340/568.1; 340/571; 235/375

(58) Field of Classification Search ............... 340/572.3, 340/572.1, 572.4, 572.7, 568.1, 571; 235/492, 235/375, 385
See application file for complete search history.

(56) References Cited

U.S. PATENT DOCUMENTS

| | | | |
|---|---|---|---|
| 4,318,090 A | 3/1982 | Narlow et al. | |
| 4,574,274 A | 3/1986 | Pinneo | |
| 5,257,009 A | 10/1993 | Narlow | |
| 5,608,379 A | 3/1997 | Narlow et al. | |
| 5,955,951 A | 9/1999 | Wischerop et al. | |
| 7,152,804 B1 * | 12/2006 | MacKenzie et al. | 235/492 |
| 7,286,053 B1 * | 10/2007 | Gudeman et al. | 340/572.1 |
| 7,387,260 B1 * | 6/2008 | MacKenzie et al. | 235/492 |
| 7,750,792 B2 * | 7/2010 | Smith et al. | 340/10.4 |
| 2005/0179551 A1 | 8/2005 | Lian et al. | |
| 2005/0183817 A1 | 8/2005 | Eckstein et al. | |

FOREIGN PATENT DOCUMENTS

| | | |
|---|---|---|
| FR | 2669756 A1 | 11/1990 |
| WO | 00/16289 A1 | 3/2000 |

OTHER PUBLICATIONS

International Search Report and Written Opinion dated Mar. 14, 2006 for International Application No. PCT/US2005/041679, International Filing Date: Nov. 18, 2005 (7-pages).
International Search Report and Written Opinion dated Jun. 15, 2010 for International Application No. PCT/US2010/000801, International Filing Date: Mar. 16, 2010 consisting of 8-pages.
International Search Report and Written Opinion dated Mar. 4, 2010 for International Application No. PCT/US2009/005590, International Filing Date Oct. 13, 2009 consisting of 10 pages.

* cited by examiner

*Primary Examiner* — Toan N Pham
(74) *Attorney, Agent, or Firm* — Alan M. Weisberg; Christopher & Weisberg, P.A.

(57) ABSTRACT

A combination Electronic Article Surveillance/Radio Frequency Identification ("EAS/RFID") tag and method and system for deactivating said combination EAS/RFID tags without the need to physically contact the tag with a deactivation device. The EAS/RFID tag replaces the conventional diode with a non-linear device such as a capacitor with a given breakdown voltage threshold. Inducing a predetermined voltage across the capacitor results in destruction of the capacitor rendering the EAS/RFID tag undetectable in the interrogation systems.

20 Claims, 4 Drawing Sheets

METHOD AND SYSTEM FOR DEACTIVATION OF COMBINATION EAS/RFID TAGS

CROSS-REFERENCE TO RELATED APPLICATION

This application a continuation-in-part of patent application Ser. No. 12/331,604, filed Dec. 10, 2008, entitled METAL OXIDE SEMICONDUCTOR DEVICE FOR USE IN UHF ELECTRONIC ARTICLE SURVEILLANCE SYSTEMS, and claims priority to U.S. National Stage patent application Ser. No. 11/791,089, filed Apr. 28, 2008 which claims the benefit from PCT Application Serial Number PCT/US05/041679, filed Nov. 18, 2005 which claims priority from Provisional Application Ser. No. 60/630,351, filed Nov. 23, 2004, the entirety of all which are incorporated herein by reference.

STATEMENT REGARDING FEDERALLY SPONSORED RESEARCH OR DEVELOPMENT

N/A

FIELD OF THE INVENTION

The present invention relates generally to article interrogation systems and more specifically to a method and system for deactivating a combined electronic article surveillance (EAS) and radiofrequency identification (RFID) device in Ultra High Frequency ("UHF") or other types of interrogation systems without the need to physically contact the tag with a deactivation device.

BACKGROUND OF THE INVENTION

Mixing labels or mixing tags are used in Ultra High Frequency ("UHF") electronic article surveillance ("EAS") interrogation systems and are based on a frequency mixing principle. Typically, mixing tags include a diode attached to a dipole antenna. The tag is tuned at a specific microwave frequency $f_{uhf}$, such as for example 915 MHz. The frequency range can be chosen from hundreds of Megahertz up to several Gigahertz by adjusting the antenna's dipole length and the diode's junction capacitance. The lower the operating microwave frequency, the longer the dipole length required, and the larger the resultant capacitance.

However, there are inherent limitations with deactivation devices when having to deactivate tags having diodes. For example, U.S. Pat. Nos. 4,318,090 and 4,574,274 provide UHF mixing tags that use diode non-linear elements and means for direct contact or non-direct contact but with limited range. The breakdown characteristics of the diode requires that a substantial current be driven through diode in order to achieve deactivation, thus resulting in the direct contact with the tag in order to supply sufficient electrical energy to the diode to cause it to be destroyed, thereby deactivating the tag. This results in an impractical deactivation system since it is not always possible or economically feasible to be limited to this type of "contact" deactivation. Thus, tag designs of this type are ineffective in situations where deactivation of the tag takes place from a distance, i.e., where the deactivation device is not in contact with the tag. Other prior art deactivation systems (such as the system disclosed in U.S. Pat. No. 5,608,379) have attempted to avoid this problem by adding switches and other hardware devices to the deactivation system. This proves to be costly and cumbersome and results in relatively low deactivation distances for a considerably large magnetic field source.

Neither of the aforementioned attempted solutions solves the problem of how to effectively deactivate combination EAS tags at a substantial distance without the need for the deactivation device to be in direct contact with the EAS/RFID tag and without the need to provide additional deactivation elements to the EAS tag. The inherent characteristics of diodes with their predictable non-linear behavior render EAS deactivation systems that utilize these types of tags ineffective when it comes to deactivating tags from a distance.

FIG. 1 illustrates a prior art design of a mixing marker 2 or mixing tag often used in electronic article surveillance ("EAS") systems. Mixing markers of this type are inherently deficient in tag deactivation systems due to the amount of energy needed to destroy the diode, which is typically designed to be robust and rectify and control voltages. The nonlinearity of the intrinsic capacitance and relatively low voltage breakdown characteristics of the MOS capacitor are more desirable than the diode in this aspect. In FIG. 1, the diode 4 appears between two parts of the antenna 6. Tag designs of this type are ineffective in situations where deactivation of the tag takes place from a distance, i.e., where the deactivation device is not in contact with the tag.

The inadequate methods of deactivating EAS tags described above can also apply to combination EAS/RFID tags. With the advent of RFID technology, many retailers are considering tagging merchandise (e.g., per item, per case, per pallet) with RFID tags. At the same time, electronic article surveillance (EAS) technology and devices have proven critical to the reduction of theft and so called "shrinkage". It is envisioned that RFID devices can also provide many of the same advantages known to EAS technology coupled with additional advantages or capabilities such as inventory control, shelf reading, non-line of sight reading, etc.

Therefore, what is needed is a method of deactivating a combination EAS/RFID tag where the combination tag incorporates a non-linear element that exhibits very low level breakdown characteristics so that reliable deactivation at a considerable distance is achieved.

SUMMARY OF THE INVENTION

The present invention advantageously provides a system, method and apparatus for facilitating the deactivation of combination EAS/RFID tags in UHF interrogation systems by incorporating an element, such as a linear capacitor or non-linear MOS capacitor, in the tag. In one aspect of the invention, a combination electronic article surveillance/radio frequency identification ("EAS/RFID") device is provided. The EAS/RFID device includes a semiconductor device having an EAS circuit and an RFID circuit. The device also includes an antenna circuit in electrical communication with the semiconductor device, and a capacitor where the capacitor includes an insulation layer. Application of a predetermined voltage to the capacitor results in electrical breakdown of the insulation layer resulting in permanent deactivation of the EAS/RFID device.

In another aspect, a combination electronic article surveillance/radio frequency identification ("EAS/RFID") deactivation system is provided. The system includes a combination EAS/RFID tag, where the tag includes a semiconductor device having an EAS circuit and an RFID circuit, and an antenna circuit. The antenna circuit is in electrical communication with the semiconductor device. The system also includes a capacitor, where the capacitor includes an insulation layer. Application of a predetermined voltage to the capacitor results in electrical breakdown of the insulation layer resulting in permanent deactivation of the EAS/RFID device. The system further includes a deactivation device adapted to cause application of the predetermined voltage to the capacitor when the combination EAS/RFID tag is placed in non-contact proximity to the deactivation device.

In another aspect of the invention, a method of deactivating a combination electronic article surveillance/radio frequency identification ("EAS/RFID") tag without physically contacting the tag is provided. The method includes providing a semiconductor device having an EAS circuit and an RFID circuit, providing an antenna circuit in electrical communication with the semiconductor device, providing a capacitor, the capacitor including an insulation layer, and applying a predetermined voltage to the capacitor that results in electrical breakdown of the insulation layer resulting in permanent deactivation of the EAS/RFID device.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
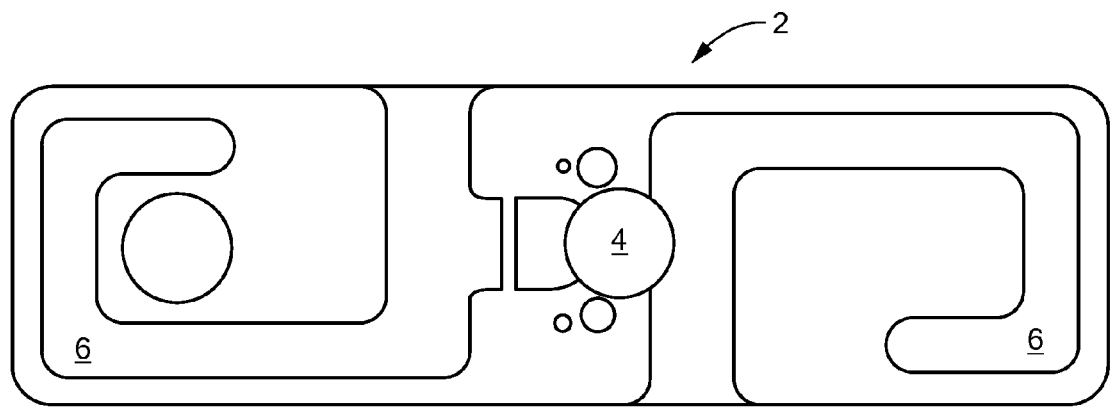
FIG. 1 is a layout of a UHF mixing tag illustrating a prior art tag design utilizing a diode and a dipole antenna.

Before describing in detail exemplary embodiments that are in accordance with the present invention, it is noted that the embodiments reside primarily in combinations of apparatus components and processing steps related to implementing a system, device and method for facilitating the deactivation of combination EAS/RFID tags in a proximity deactivation environment by including within the tag, a non-linear device that is suitable for breakdown with a low voltage. As used herein, the term "low voltage" generally refers to voltages less than approximately 10 Volts. It is understood, however, that the invention is not limited solely to devices which must have such a value when used in the context of breakdown voltages. Depending on the design of the tag, values greater than 10 Volts may be used. The combination EAS/RFID device of the present disclosure is capable of performing dual EAS/RFID functions, i.e., the RFID function provides extensive information about the tagged item while the attached EAS function provides limited information regarding the item (activated/de-activated).

Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 2:
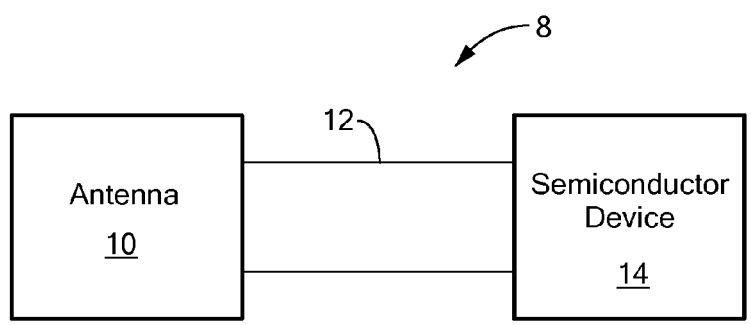
FIG. 2 is a block diagram of an integrated EAS/RFID device that incorporates the principles of the present invention.

Referring now in detail to the drawings wherein like parts may be designated by like reference numerals throughout, as illustrated in FIG. 2, the components of a combination EAS/RFID tag or marker 8 of the present disclosure include an antenna 10 which is an energy coupling device designed to receive and retransmit the energy and signal 12 from an intelligent semiconductor device 14. The antenna 10 may be dedicated to receiving and backscatter transmitting energy and signals related to the tag or marker 8. The antenna 10 may be a dipole antenna for ultrahigh frequency (UHF) applications and may be a coil antenna for high frequency (HF) applications. The embodiments are not limited in this context. Semiconductor 14 is designed to perform analytical and computational functions. Antenna 10 is operatively coupled to the semiconductor device 14 via signal 12 and serves as a transceiver device for both EAS and RFID functions. Although the antenna 10 is shown as being separate from the semiconductor device 14, in one embodiment, the antenna 10 may also be formed on the semiconductor device 14 as an integrated unit. The embodiments are not limited in this context.

The semiconductor device 14 includes built-in, dual-function circuits, for controlling EAS and RFID functions, respectively. It is possible that the circuitry controlling the EAS/RFID functions may share the same (or portions of the same) circuitry or be coupled to a common component, e.g., antenna 10. A reader may also be designed to cooperate with either (or both) the EAS or RFID devices/functions. Such a reader is disclosed in commonly-owned, U.S. Provisional Patent Application No. 60/629,571, filed on Nov. 18, 2004, entitled "INTEGRATED 13.56 MHz EAS/RFID DEVICE", now concurrently filed PCT Patent Application No. PCT/US2005/041680, filed Nov. 18, 2005 and entitled "EAS READER DETECTING EAS FUNCTION FROM RFID DEVICE", both of which are incorporated herein by reference in their entirety.

The semiconductor device 14 must be fully powered in order to execute the required logic operations for various RFID applications, such as access control, document tracking, livestock tracking, product authentication, retail tasks, and supply chain tasks. The main function of an EAS device is to create a unique signature in response to a system inquiry (preferably accomplished without fully activating the RFID logic functions of an RFID tag or marker in the vicinity). As a result, the effective EAS read range is greater than the effective RFID read range and EAS devices/functions tend to be more resilient to shielding and detuning effects.

Figure 3:
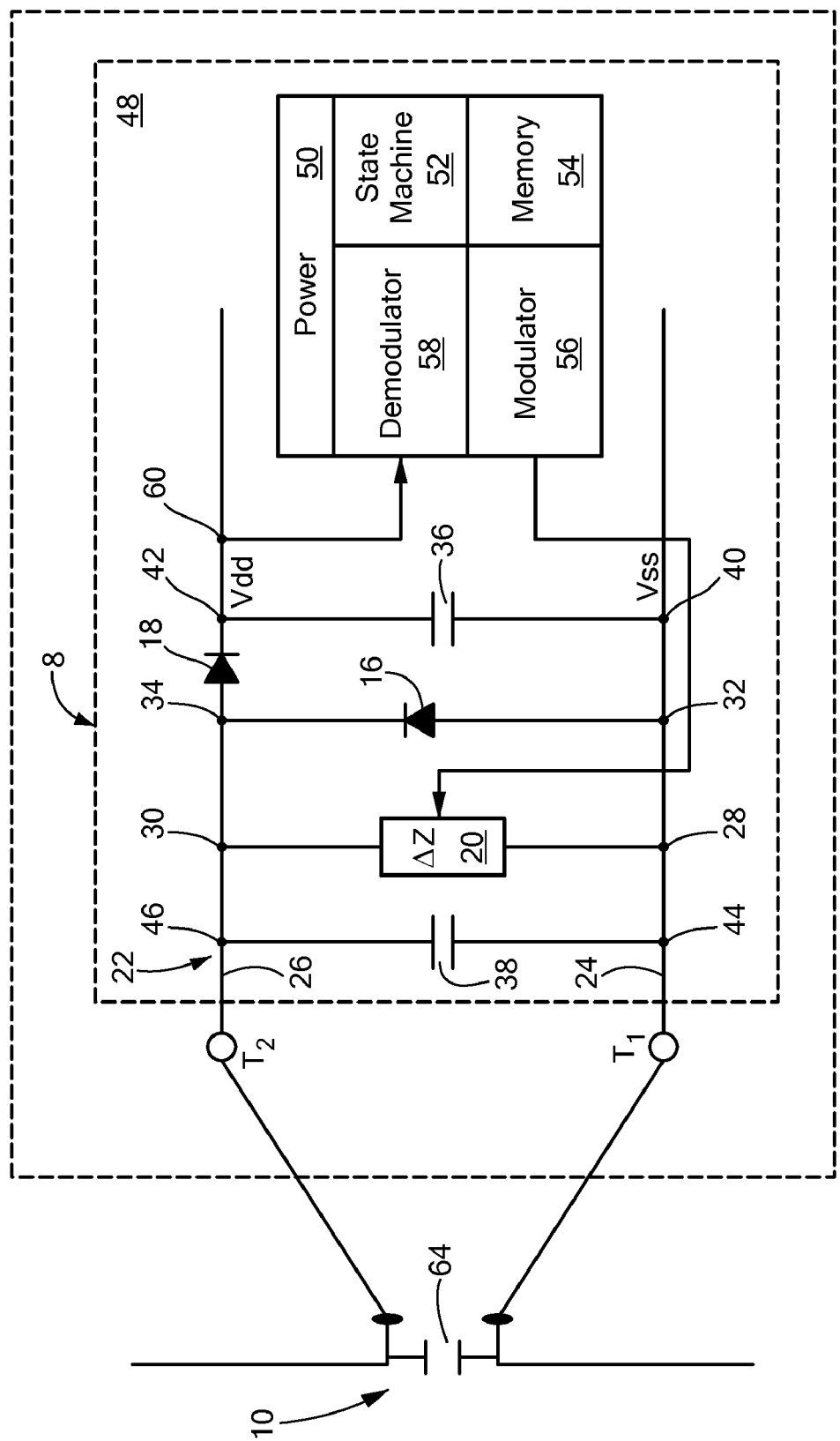
FIG. 3 is a diagram of an integrated EAS/RFID device having built-in front end circuits connected to a UHF dipole antenna with a resonating capacitor and constructed in accordance with the principles of the present invention.
Figure 4:
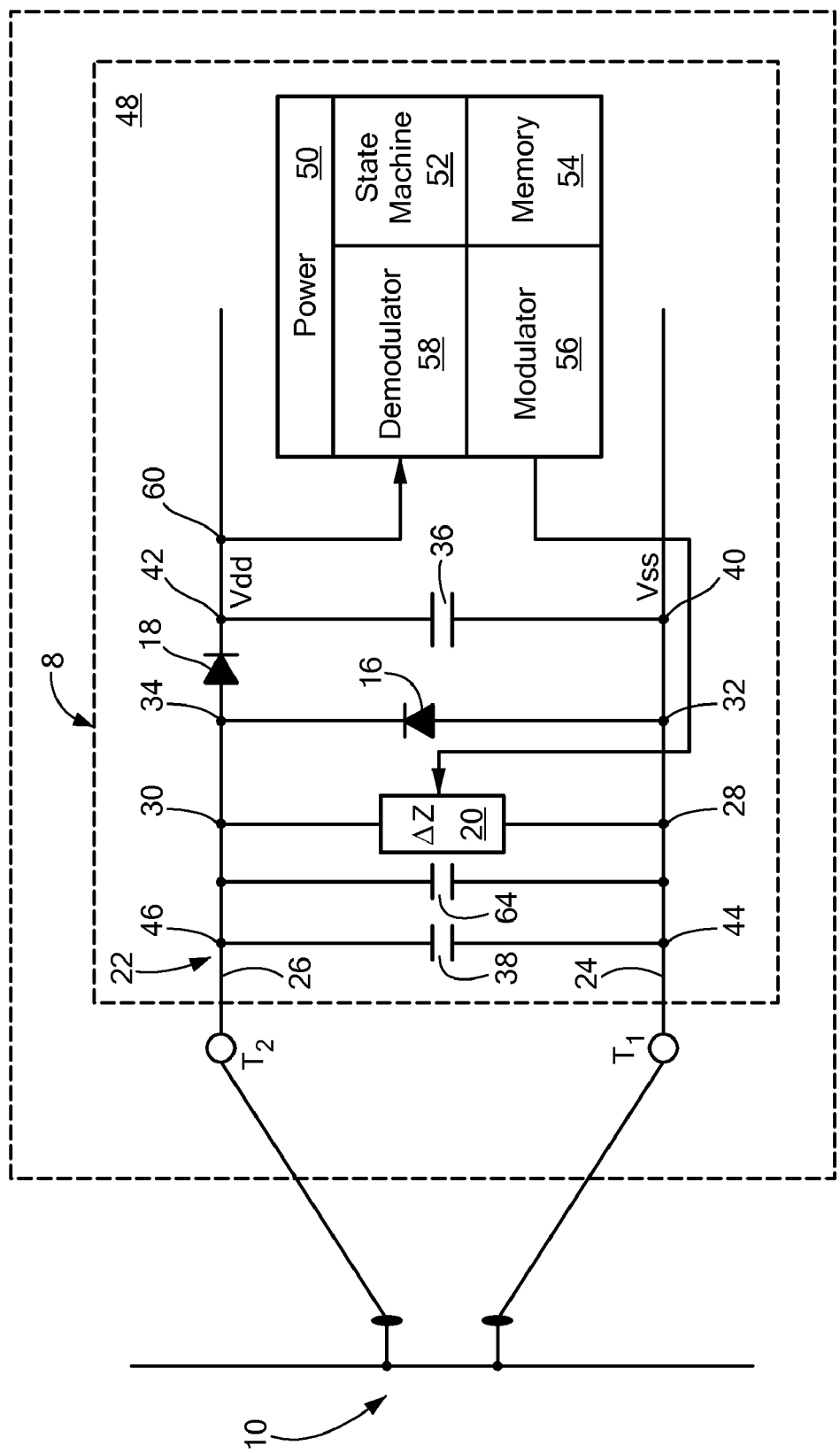
FIG. 4 is a diagram of an integrated EAS/RFID device having built-in front end circuits connected to a UHF dipole antenna with a low breakdown voltage capacitor and constructed in accordance with the principles of the present invention.

FIGS. 3 and 4 illustrate a typical architecture of an integrated EAS/RFID device 8 which acts also as an EAS marker due to its nonlinear front end circuitry. The front end circuitry of device 8 includes rectifying diodes 16 and 18 for energy harvesting, and a controllable impedance device 20 that causes the microwave mixing behavior for EAS functionality.

EAS/RFID device 8 includes a power receiving front end portion 22, which can also serve as a voltage rectifying front-end portion of the EAS/RFID device 8. The front-end portion 22 is coupled to the antenna 10 at terminals T1 and T2. Terminal T1 couples the antenna 10 to source electrode 24 while terminal T2 couples antenna 10 to drain electrode 26. Controllable impedance device 20 is coupled in parallel to electrodes 24 and 26 at junctions 28 and 30, respectively. Diode 16 is coupled in parallel to electrodes 24 and 26 at junctions 32 and 34, respectively. Similarly, capacitors 36 and 38 are coupled in parallel to electrodes 24 and 26 at junctions 40 and 42, and 44 and 46, respectively. Source voltage Vss at junction 40 and drain voltage Vdd at junction 42 provide energy for storage by the capacitor 36.

In one embodiment, front end portion 22 of device 8 mixes a UHF (ultrahigh frequency) signal with a radio frequency (RF) electric field based on the non-linearity of the front end 22 of the integrated EAS/RFID device 8. More particularly, such an embodiment is described in detail in commonly owned, co-pending U.S. patent application Ser. No. 11/144,883 filed on Jun. 3, 2005 entitled "TECHNIQUES FOR DETECTING RFID TAGS IN ELECTRONIC ARTICLE SURVEILLANCE SYSTEMS USING FREQUENCY MIXING", the contents of which is incorporated by reference herein in its entirety.

The programming functions of device 8 are provided by the RFID back end portion 48 via a power controller 50 which includes at least a state machine 52, which is a switching device which executes logic operations, memory 54, modulator 56 and demodulator 58. Memory 54 may comprise, for example, program memory, data memory, or any combination thereof Memory 54 may also comprise, for example, random access memory (RAM), read only memory (ROM), programmable read only memory (PROM), erasable programmable read only memory (EPROM), electrically erasable programmable read only memory (EEPROM), or combinations thereof, and the like. The modulator 56 is coupled to the modulation impedance device 20. Drain electrode 26 is coupled at junction 60 to the demodulator 58. The state machine 52 determines the operating condition of and controls modulation impedance device 20. The operating conditions are stored in the memory 54. The state machine 52 also controls modulation impedance device 20 through modulator 56. Energy is provided to the power controller 50 typically via capacitors 36 and 38. As described above, EAS/RFID device 8 is electrically coupled to resonating antenna structure 10, i.e., a UHF dipole antenna having a low breakdown voltage linear capacitor 64, for efficient absorption or reflection of the microwave energy, as shown in FIG. 3. By altering the thickness of the dielectric layer of the low breakdown voltage capacitor 64, deactivation of device 8 can be accomplished at a distance and without the need for there to be a physical contact between the deactivation device and device 8. At the time of deactivation, a step-up voltage can be issued from the RFID process in order to breakdown and short the thin dielectric layer. Alternatively, a high voltage can be induced through the coupling with an adjacent antenna.

In an alternate embodiment, the low breakdown voltage capacitor 64 is a low breakdown voltage non-linear MOS capacitor. In addition to diodes 16 and 18, use of a MOS capacitor may further enhance mixing performance due to its intrinsic non-linearity. This allows the breakdown and shorting of the antenna 10 resulting in deactivation of the EAS/RFID device 8.

In another embodiment, modulating element 20, which is inherent in the RFID circuit and which provides backscatter, can be a metal-oxide-semiconductor field-effect transistor ("MOSFET") with a low voltage breakdown characteristic. Referring to FIG. 3, conductivity of the MOSFET is controlled by the gate voltage. By applying a binary control voltage, the resistance of the MOSFET swings between a high and a low value. Using a MOSFET device having a low breakdown voltage as the modulating element 20 results a thin gate insulation. To deactivate EAS/RFID device 8, a deactivating voltage is applied to the gate. With the breakdown of the gate insulated layer the element will stay at a state of high impedance, if it is an enhanced mode FET. With a depletion mode FET, the device will have a low impedance.

Referring to FIG. 4, another embodiment of the invention is shown. In this embodiment, low voltage capacitor 64 resides in semiconductor device 8 rather than in antenna structure 10. Capacitor 64 can be in parallel with capacitor 38, as shown or, in an alternate embodiment, capacitor 64 can combine with capacitor 38. For HF frequencies, capacitor 38 is included in order to more easily tune the antenna 10 for resonance with the EAS/RFID device 8. For UHF frequencies, capacitor 38 is usually not present. In either instance, breakdown is achieved by altering the thickness of the dielectric layer of the low breakdown voltage capacitor 64 as described above and deactivation of device 8 can be accomplished at a distance and without the need for there to be a physical contact between the deactivation device and device 8.

Figure 5:
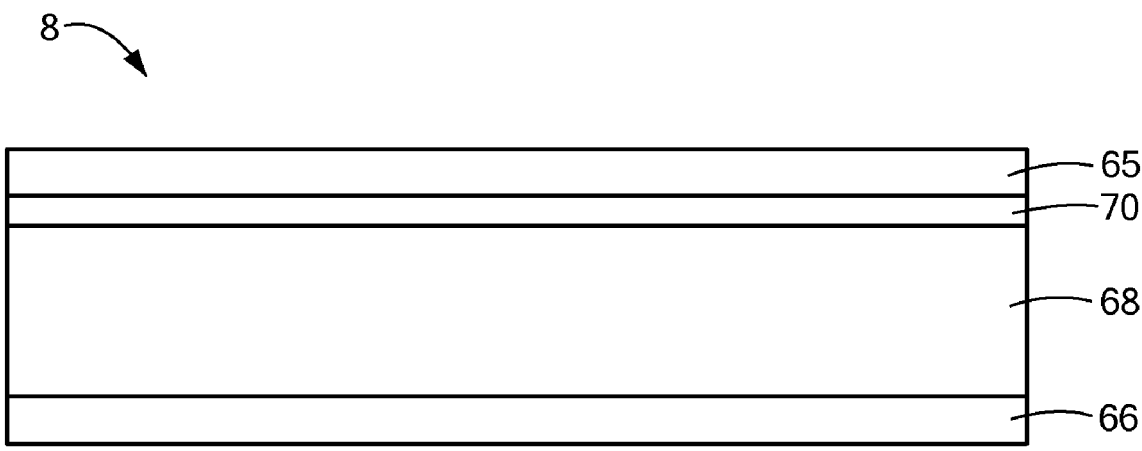
FIG. 5 is a side view a non-linear MOS capacitor used with a combination EAS/RFID tag and constructed in accordance with the principles of the present invention.

To facilitate the ease of deactivation, the breakdown voltage of the MOS capacitor of EAS/RFID device 8 can be further minimized. FIG. 5 illustrates the components of integrated EAS/RFID tag 8. The design depicted in FIG. 5 is one embodiment, and it is within the scope of the invention to modify this design such that it is suitable and compatible with the existing fabrication techniques. Device 8 includes a top electrode layer 65, a bottom electrode layer 66, a semiconductor region 68 and an insulation layer 70. Due to the insulated layer 70 within the structure, the device behaves like a capacitor.

Thus, deactivation can be achieved by reducing the thickness of insulation/dielectric layer 70. With a thinner layer, a high E-field can be generated to induce breakdown. Alternately, it is possible to choose different kinds of insulators having lower breakdown voltages. In yet another embodiment, impurity or defect centers may be included during the deposition of the dielectric layers to encourage the breakdown.

Thus, the MOS capacitor has a built-in breakdown voltage characteristic that determines the deactivation characteristics in device 8. A deactivator device provides an E-field source within regulatory limits at a determined operating frequency. The E-field couples to device 8 to provide the necessary breakdown of the thin oxide layer of the MOS device capacitor. Below this breakdown threshold, the MOS device operates as a non-linear capacitor. However, after breakdown is achieved, the MOS device operates irreversibly as a linear capacitor with a somewhat lower capacitance value. Absence of the non-linearity characteristic renders mixing device undetectable in an EAS mixing system.

The present invention is applicable to UHF RFID systems as well as on any device operating at high frequencies (HF)

(e.g., 13.56 MHz). At high frequencies, a loop antenna having approximately 7 to 10 turns and having a surface area of about 4 cm by 7 cm, is utilized.

The present invention provides the capability of deactivating a combination EAS/RFID device 8 without the need for a tag deactivator to be in contact with device 8. As described above, this can be done in a number of ways. Each way achieves a very low impedance across the antenna terminals when the induced or applied voltage across the terminals reaches a critical low voltage breakdown level. In one embodiment, the resonating capacitor 62 is replaced with a low breakdown voltage capacitor 64. Capacitor 64 may be placed across the terminals of the antenna as part of antenna structure 10, as shown in FIG. 3, or may be placed within semiconductor device 8, either in parallel with or as part of capacitor 38, as shown in FIG. 4. In one embodiment, low voltage capacitor 64 is a low breakdown MOS device. In addition to altering the capacitor in antenna 10, the circuitry of device 8 can also be altered to provide remote deactivation capability. For example, the modulating element 20 within the EAS/RFID device 8 can be replaced by a MOSFET.

The CV characteristic of the MOS capacitor depends on the doping concentration of the semiconductor, thickness of the insulation layer 70, and the types of materials used for electrode layers 65 and 66. The design of the present invention can be altered such that the degree of non-linearity can exceed that of a diode (as used in the prior art) thus further enhancing the UHF system performance. Further, the MOS capacitor can be deactivated at distances from the deactivator beyond those EAS/RFID devices that use diodes. This arrangement is advantageous when using disposable EAS/RFID devices 8.

Contrary to a diode, the MOS device capacitor can be destroyed by applying a high enough voltage ($V_G$) across the electrodes. The capacitance vs. voltage is non-linear below the threshold voltage, but beyond the threshold breakdown voltage the device irreversibly operates as a linear capacitor, thus permanently eliminating any mixing signal. As a result, the EAS function can be effectively eliminated and/or altered resulting in the ceased production of the mixing signal. i.e., deactivation occurs. With the relatively low breakdown voltage of the low breakdown voltage capacitor of the MOS capacitor it is possible to create a deactivation distance without adding additional features to the non-linear element of the EAS/RFID device 8.

To facilitate the ease of deactivation, the breakdown voltage of the capacitor of device 8 can be further minimized. This can be achieved by, for example, reducing the thickness of insulation/dielectric layer 70. With a thinner layer, a high E-field can be generated to induce breakdown. Alternately, it is possible to choose different kinds of insulators having lower breakdown voltages. In yet another embodiment, impurity or defect centers may be included during the deposition of the dielectric layers to encourage the breakdown.

The present invention advantageously provides and defines a device, system and method used to facilitate the deactivation of combination EAS/RFID tags in a proximity deactivation environment by including a low breakdown voltage capacitor, such as a MOS capacitor, or by including within the RFID chip circuitry, a MOSFET having a low breakdown voltage.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A combination electronic article surveillance/radio frequency identification ("EAS/RFID") device comprising:
   a semiconductor device having an EAS circuit and an RFID circuit;
   an antenna circuit in electrical communication with the semiconductor device; and
   a capacitor, the capacitor including an insulation layer, wherein application of a predetermined voltage to the capacitor results in electrical breakdown of the insulation layer resulting in permanent deactivation of the EAS/RFID device.

2. The combination EAS/RFID device of claim 1, wherein the capacitor is one of a linear capacitor and a non-linear MOS capacitor and is part of the antenna circuit.

3. The combination EAS/RFID device of claim 1, wherein the capacitor is a linear capacitor and is part of the semiconductor device.

4. The combination EAS/RFID device of claim 1, wherein the capacitor is a non-linear MOS capacitor and is part of the semiconductor device.

5. The combination EAS/RFID device of claim 4, wherein application of the predetermined voltage to the MOS capacitor results in destruction of the MOS capacitor, thereby rendering the combination EAS/RFID device undetectable by an EAS interrogation system.

6. The combination EAS/RFID device of claim 4, further comprising a step-up circuit electrically coupled to the MOS capacitor, the step-up circuit increasing the voltage applied to the MOS capacitor.

7. The combination EAS/RFID device of claim 6, wherein the step-up circuit includes a switch that is activated at a predetermined voltage, making the increased voltage available to the MOS capacitor.

8. The combination EAS/RFID device of claim 1, wherein the predetermined voltage is less than 10 Volts.

9. The combination EAS/RFID device of claim 1, wherein the semiconductor device includes a modulating element.

10. The combination EAS/RFID device of claim 9, wherein the modulating element is a MOSFET.

11. The combination EAS/RFID device of claim 10, wherein the MOSFET has a gate insulation layer that can be broken down upon application of the predetermined voltage.

12. The combination EAS/RFID device of claim 1, wherein the EAS/RFID device is a mixing tag modulated by a combination of high frequency and low frequency signals.

13. A combination electronic article surveillance/radio frequency identification ("EAS/RFID") deactivation system comprising:
   a combination EAS/RFID tag, the tag comprising:
      a semiconductor device having an EAS circuit and an RFID circuit;
      an antenna circuit in electrical communication with the semiconductor device; and
      a capacitor, the capacitor including an insulation layer, wherein application of a predetermined voltage to the capacitor results in electrical breakdown of the insulation layer resulting in permanent deactivation of the EAS/RFID device; and a deactivation device adapted to cause application of the predetermined voltage to the capacitor when the combination EAS/RFID tag is placed in non-contact proximity to the deactivation device.

14. The combination EAS/RFID system of claim 13, wherein the capacitor is part of the antenna circuit.

15. The combination EAS/RFID system of claim 13, wherein the capacitor is part of the semiconductor device.

16. The combination EAS/RFID system of claim 13, wherein the capacitor is a MOS capacitor.

17. The combination EAS/RFID system of claim 13, wherein the predetermined voltage is less than 10 Volts.

18. The combination EAS/RFID system of claim 13, wherein the semiconductor device includes a modulating element.

19. The combination EAS/RFID system of claim 18, wherein the modulating element is a MOSFET.

20. A method of deactivating a combination electronic article surveillance/radio frequency identification ("EAS/RFID") tag without physically contacting the tag, the method comprising:
 providing a semiconductor device having an EAS circuit and an RFID circuit;
 providing an antenna circuit in electrical communication with the semiconductor device;
 providing a capacitor, the capacitor including an insulation layer, and applying a predetermined voltage to the capacitor that results in electrical breakdown of the insulation layer resulting in permanent deactivation of the EAS/RFID device.

\* \* \* \* \*